United States Patent [19]

Ahn

[11] Patent Number: 5,982,509
[45] Date of Patent: Nov. 9, 1999

[54] VIDEO INTERFACING TECHNIQUE FOR TRANSMITTING RESET SIGNALS IN AN IMAGE FORMING DEVICE HAVING VIDEO AND ENGINE CONTROLLERS

[75] Inventor: Sang-Kil Ahn, Suwon, Rep. of Korea

[73] Assignee: Samsung Electronics Co., Ltd., Kyungki-do, Rep. of Korea

[21] Appl. No.: 08/782,637

[22] Filed: Jan. 14, 1997

[30] Foreign Application Priority Data

Jan. 16, 1996 [KR] Rep. of Korea ........................... 96-746

[51] Int. Cl.⁶ ..................................................... H04N 1/32
[52] U.S. Cl. ........................ 358/468; 358/400; 358/442; 358/443; 358/468; 358/502; 358/504; 358/527
[58] Field of Search ..................................... 358/468, 442, 358/400, 443, 502, 504, 527; 395/200.45, 109, 111, 113

[56] References Cited

U.S. PATENT DOCUMENTS

| | | | |
|---|---|---|---|
| 4,686,698 | 8/1987 | Tompkins et al. | 348/230 |
| 4,741,020 | 4/1988 | Deal et al. | 340/311.1 |
| 4,742,483 | 5/1988 | Morrell | 395/112 |
| 5,023,631 | 6/1991 | Negishi et al. | 347/129 |
| 5,235,674 | 8/1993 | Cohen-Skalli | 358/468 |
| 5,243,380 | 9/1993 | Pesar et al. | 399/10 |
| 5,270,774 | 12/1993 | Kikuchi | 399/8 |
| 5,398,100 | 3/1995 | Ishizu et al. | 358/296 |
| 5,426,458 | 6/1995 | Aiba et al. | 358/435 |
| 5,430,554 | 7/1995 | Konakai | 439/62 |
| 5,748,337 | 5/1998 | Minamizawa | 358/468 |

Primary Examiner—Christopher S. Kelley
Assistant Examiner—Sheela Chawan
Attorney, Agent, or Firm—Robert E. Bushnell, Esq.

[57] ABSTRACT

A video interfacing technique in an image forming device having video and engine control units, includes setting a timeout variable to repeatedly transmit status messages over a predetermined time period when a communications error has occurred, and transmitting reset signals from one control unit to the other control unit to reset it, when a predetermined message is not received while the video and engine control units transmit and receive the message to and from each other.

8 Claims, 4 Drawing Sheets

VIDEO INTERFACING TECHNIQUE FOR TRANSMITTING RESET SIGNALS IN AN IMAGE FORMING DEVICE HAVING VIDEO AND ENGINE CONTROLLERS

This application makes claims all benefits accruing under 35 U.S.C. § 119 from an application for VIDEO INTERFACING METHOD earlier filed in the Korean Industrial Property Office on Jan. 16, 1996 and there duly assigned Ser. No. 746/1996.

BACKGROUND OF THE INVENTION

1. Field of the Invention

This invention relates to a technique device for forming an image, specifically, to a video interfacing technique in an image forming device having video and engine controllers.

2. Description of the Related Art

Generally, image forming devices, such as laser printers, plain paper facsimile machines, and inkjet printers, print images corresponding to data received from an external system, such as a host computer. These image forming devices have video and engine controllers. These devices print images corresponding to the encoded image sent to them according to the following process:

First, the video controller of the image forming device converts encoded information from the external system into image data that the image forming device can process, and then transmits the image data. The engine controller receives the image data from the video controller, and prints the image on paper. Referring to the structure of a laser printer having video and engine controllers, the input-output signal correlation between the video and engine controllers is set forth in the following description:

A laser printer, for example, includes a video control unit and an engine control unit and an operating panel equipment (OPE). The video control unit has a computer interface for interfacing with the host computer and a video controller connected to the computer interface and OPE and an engine interface connected to the video controller. The engine control unit includes a video interface connected to the engine interface for interfacing signals therebetween. The video control unit also includes an engine controller connected to the video interface and an input/output (I/O) interface connected to the engine controller for interfacing the engine controller with a sensor circuit, a machinery driving unit, and an electrophotography unit, these three elements also being contained in the engine control unit.

The video controller includes a control program stored in a read only memory (ROM) and a random access memory (RAM) needed for various purposes including buffering information transmitted between the host computer and the OPE. The video controller converts data received through the computer interface into image data and then transmits it to the engine control unit. The engine interface interfaces the engine control unit and the video controller so that input/output signals can be transferred under the control of the video controller. The OPE, which is controlled by the video control unit, has a display and multiple keys for entering various commands. The engine control unit is connected to the video control unit. The video interface allows for the transmission and reception of signals between the video control unit and the engine controller. The engine controller controls the machinery driving unit and electrophotography unit according to the instructions of the video control unit and prints the image corresponding to the image data received from the video control unit. It also senses the operating conditions of the engine control unit such that as the condition of the paper supply and transfer through the sensor circuit. The sensor circuit receives input from various sensors for monitoring the printing process, such as the state of the paper supply and transfer, the amount of developer, etc., and sends this information to the engine controller. The machinery driving unit operates various mechanisms for paper supply and transfer and printing according to the instructions of the engine controller. The electrophotography unit prints the image corresponding to the image data on paper using an electrophotographic developing process. Numerous signals are transferred between the video controller and the engine controller. Unfortunately, errors can occur because of internal or external factors such as abnormally high voltages, static electricity, and the reception of a wrong command message. In short, errors can occur which can interrupt the operation of the video controller and the engine controller. Under these conditions, the electrical power needs to be temporarily interrupted to completely reset the laser printer, thereby involving inconvenience and the problem of a delay for the warm-up of the printer after being reset.

The following patents each discloses features in common with the present invention but do not, however, teach or suggest the specifically recited technique of the present invention: U.S. Pat. No. 5,270,774 to Kikuchi, entitled Testing Device For Electrophotographic Imaging Apparatzis, U.S. Pat. No. 5,023,631 to Negishi et al., entitled Stopping Process Control Device, U.S. Pat. No. 5,243,380 to Pesar et al., entitled Board Fault Isolation Technique, and U.S. Pat. No. 5,398,100 to Ishizu et al., entitled Image Recording Apparatus Operable With A Vertical Scan Synchronization Signal.

SUMMARY OF THE INVENTION

Accordingly, the objective of the present invention is to provide a technique for resetting a controller that has stopped its operation, in an image forming device having video and engine controllers, without interrupting electrical power.

To achieve these objectives of this invention, a video interfacing technique in an image forming device that has video and engine controllers, sets a timeout variable in order to repeatedly transmit a message over a predetermined period of time where there has been a communications error, while the video and engine controllers transmit and receive the message to and from each other, and transmits a reset signal from one controller to the other controller to reset it when the predetermined message had not been received during the set timeout variable, while the video and engine controllers transmit and receive the message to and from each other.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Concerning the attached drawings, the preferred embodiment of the present invention is described below in detail. While, many particular details appear in the attached drawings and following description, these details are provided only for a general understanding of the present invention. It would be obvious to a person having general knowledge of this technology that the present invention can be embodied without these particular details. In describing the present invention, a detailed description of a known function or construction has been omitted when it obscures the understanding of the present invention.

Figure 1:
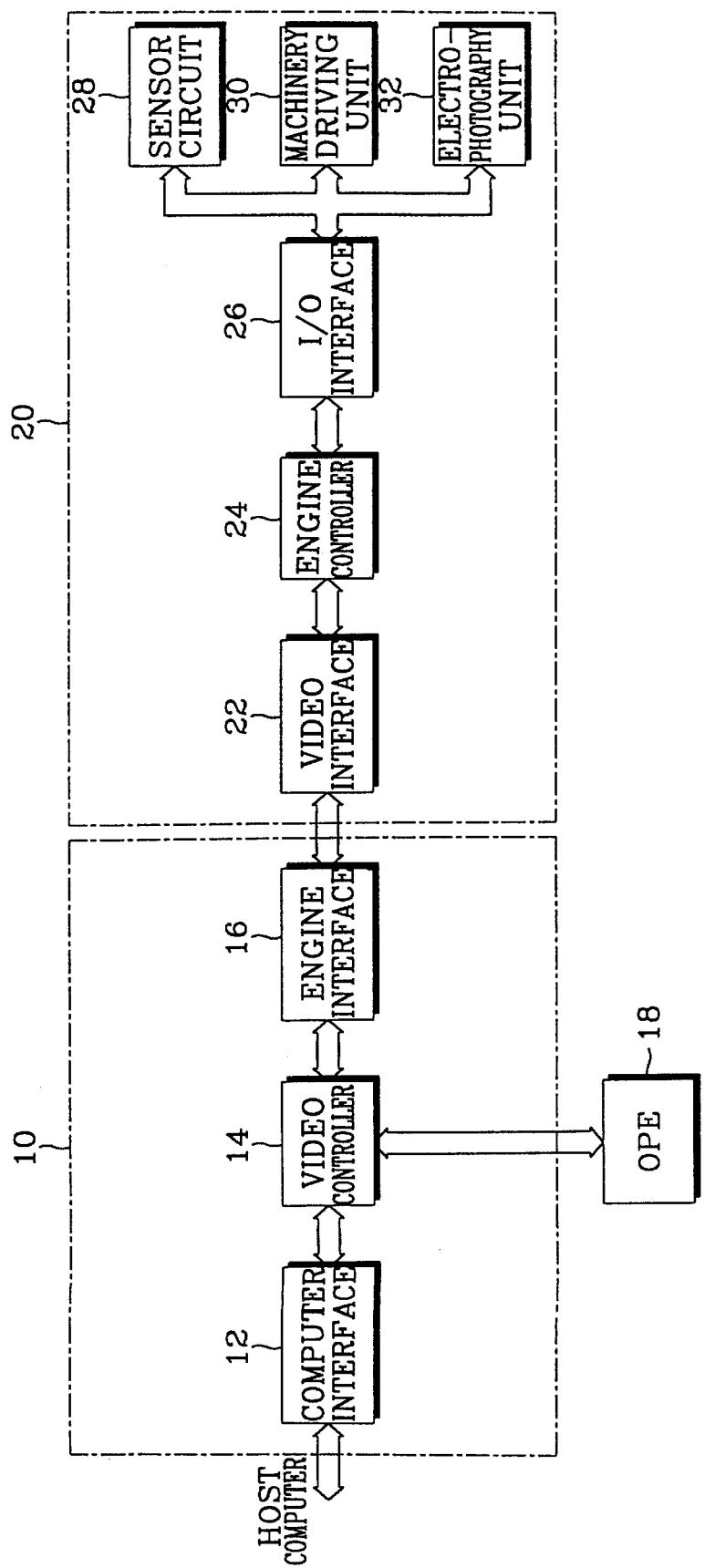
FIG. 1 is a block diagram of a laser printer.

FIG. 1 is a block diagram of a laser printer. The components of the laser printer can be broadly separated into the video control unit 10, engine control unit 20, and the operating panel equipment (OPE) 18. The video control unit 10 has a computer interface 12, video controller 14, and engine interface 16. The computer interface 12 interfaces the host computer and video controller 14 so that the input and output signals can be transferred between them. The video controller 14 includes a control program stored in a read only memory (ROM), and a random access memory (RAM) needed for various purposes including buffering information transmitted between the host computer and the OPE 18. The video controller 14 converts data received through the computer interface 12 into image data, and then transmits it to the engine control unit 20. The engine interface 16 interfaces the engine control unit 20 and the video controller 14 so that input and output signals can be transferred, under the control of video controller 14. The OPE 18, which is controlled by the video control unit, has a display and multiple keys for entering various commands. The engine control unit 20, is connected to the video controller 10, and is composed of: a video interface 22, an engine controller 24, an input/output (I/O) interface 26, a sensor circuit 28, a machinery driving unit 30, and an electrophotography unit 32. The video interface 22 allows for the transmission and reception of signals between video control unit 10 and the engine controller 24. The engine controller 24 controls the machinery driving unit 30 and electrophotography unit 32 according to the instructions of the video control unit 10, and prints the image corresponding to the image data received from the video controller 10. It also senses the operating conditions of the engine control unit 20 such as the condition of the paper supply and transfer, through the sensor circuit 28. The I/O interface 26 connects the engine controller 24 to the sensor circuit 28, machinery driving unit 30, and electrophotography unit 32, and interfaces them. The sensor circuit 28 receives input from various sensors for monitoring the printing process; such as the state of the paper supply and transfer, amount of developer, and so on, and sends this information to the engine controller 24. The machinery driving unit 30 operates various mechanisms for: paper supply, transfer, and printing, according to the instructions of the engine controller 24. The electrophotography unit 32 prints the image corresponding to the image data on paper using an electrophotographic developing process.

Figure 2:
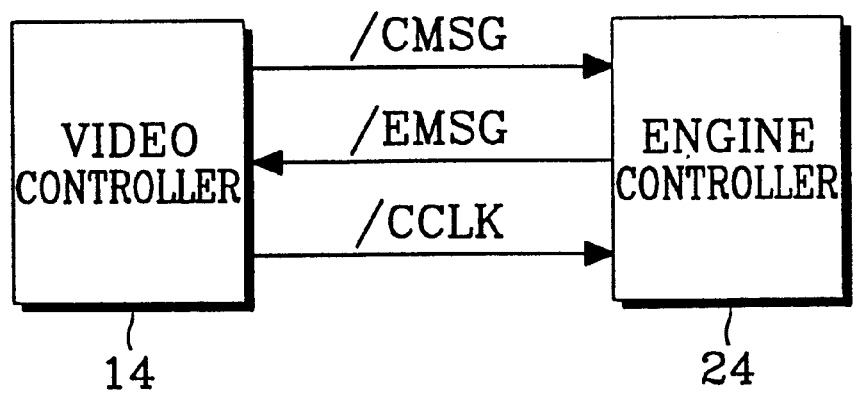
FIG. 2 is a block diagram which illustrates the signal flow between the video controller and the engine controller of the printer of FIG. 1.

FIG. 2 illustrates a flow of signals between video controller 14 and engine controller 24 of the laser printer of FIG. 1 as described above. FIG. 2 show the video controller 14 and engine controller 24 that transmit and receive serial signals through interfaces 16 and 22 for printing an image on paper under normal conditions. A command clock signal $\overline{CCLK}$ is a signal which is transmitted from the video controller 14 to the engine controller 24 for the purpose of providing a synchronizing signal to synchronize the transfer of signals between video controller 14 and engine controller 24. A command message $\overline{CMSG}$ is a signal that the video controller 14 transmits for providing a command processed by the engine controller 24. An engine message $\overline{EMSG}$ is a signal that the engine controller 24 transmits for the purpose of informing the video controller 14 of the engine state. When signals such as $\overline{CCLK}$, $\overline{CMSG}$, and $\overline{EMSG}$, are transferred between the video controller 14 and the engine controller 24, errors can occur in a printed circuit board because of internal or external factors such as abnormally high voltages, static electricity, and the reception of the wrong command message. In short, errors can occur within the printed circuit board which interrupt the operation of the video controller 14 and the engine controller 24. Under these conditions, the electrical power needs to be temporarily interrupted to completely reset the laser printer, thereby involving inconvenience and the problem of a delay for the warm-up of the printer after being reset.

Figure 3:
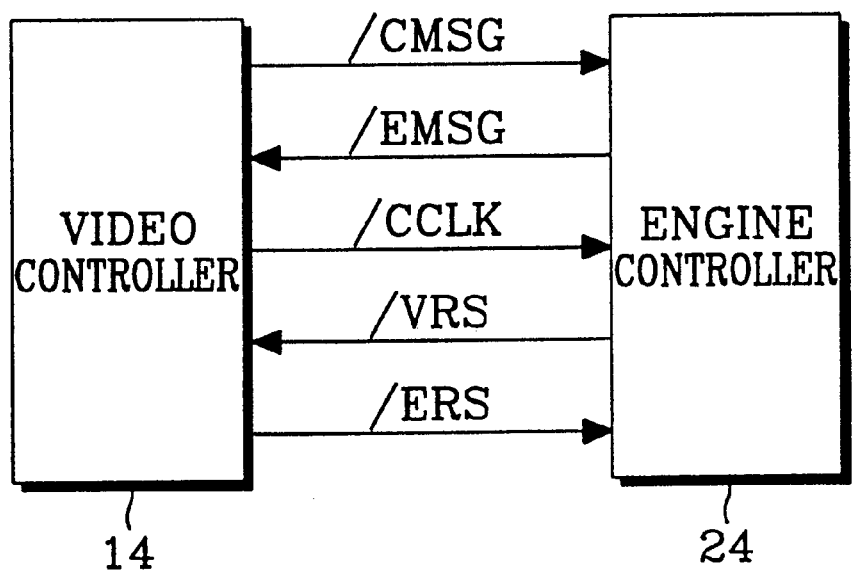
FIG. 3 illustrates the signal flow between the video controller and the engine controller, according to the present invention.

As shown in FIG. 3, the flows of $\overline{CCLK}$, $\overline{CMSG}$, and $\overline{EMSG}$ between video controller 14 and engine controller 24 are identical to the flows of the printer of FIGS. 1 and 2. A video reset signal $\overline{VRS}$ is transmitted from the engine controller 24, when the operation of the video controller 14 has stopped, to reset the video controller. Similarly, an engine reset signal $\overline{ERS}$ is transmitted from the video controller 14 to the engine controller 24 to reset the engine controller 24 when it has stopped. The procedure for outputting the $\overline{VRS}$ and $\overline{ERS}$ signals from the engine controller 24 and video controller 14, is described below, referring to FIGS. 4A and 4B.

Figure 4A:
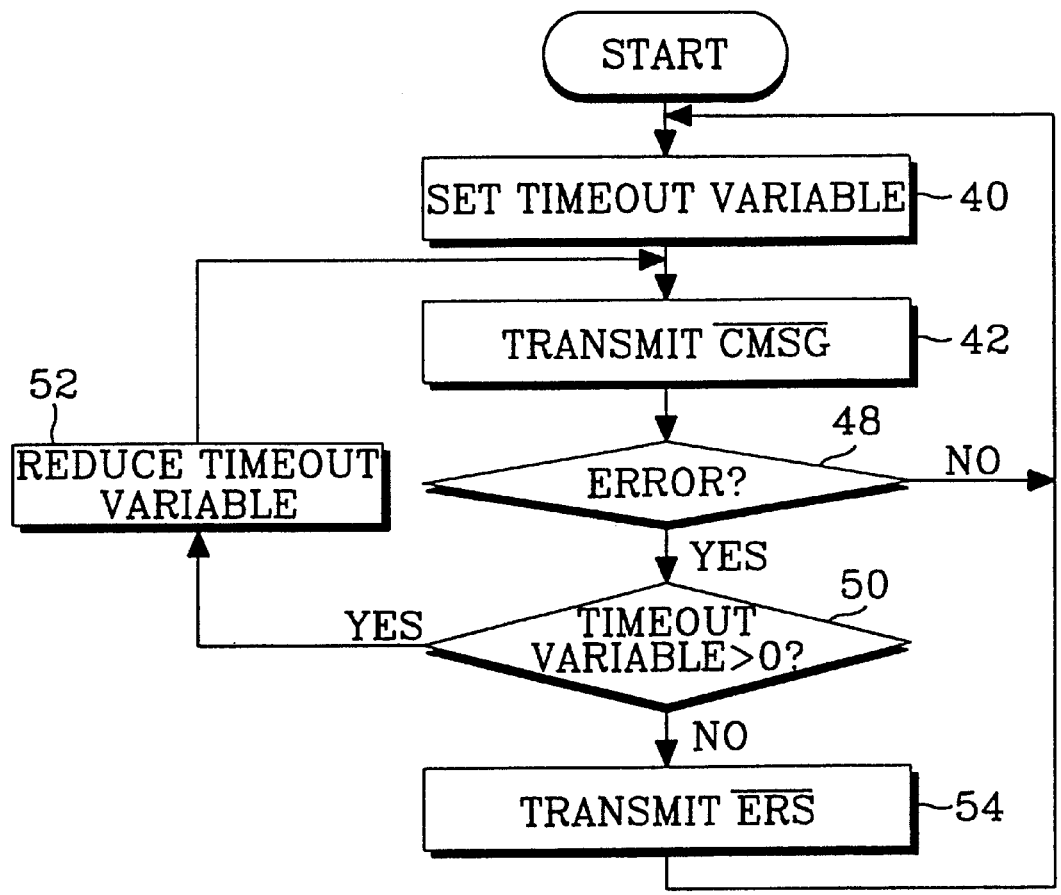
FIGS. 4A and 4B are flowcharts of the operation of the video controller and the engine controller according to the present invention.
Figure 4B:
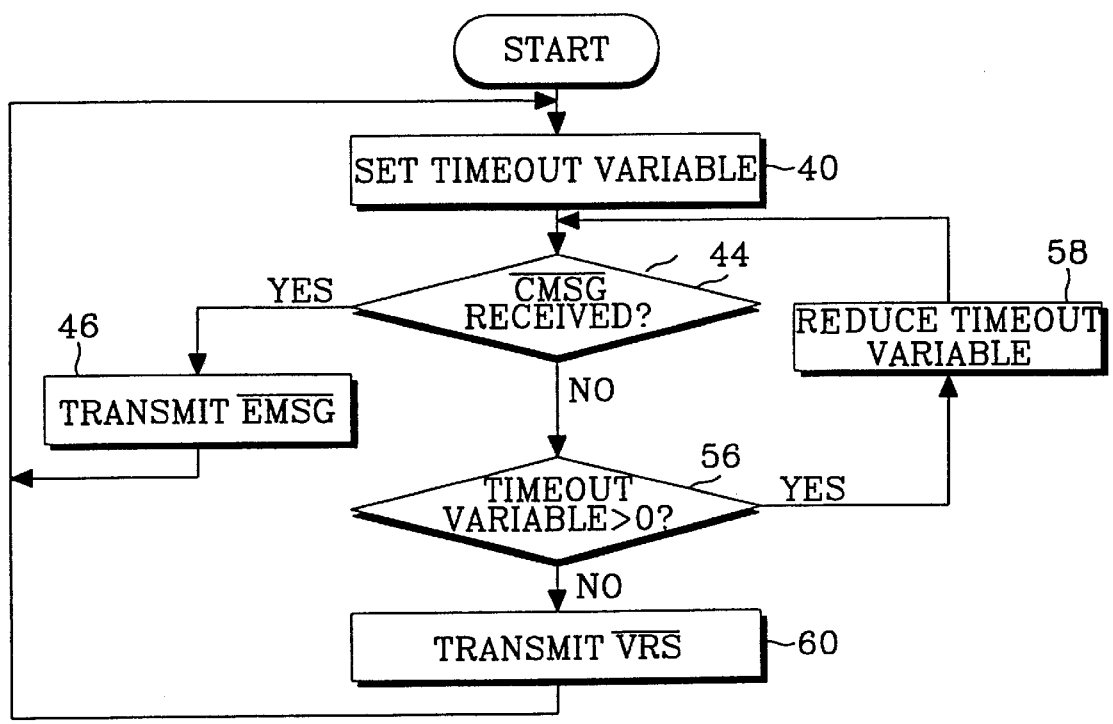

FIGS. 4A and 4B are flowcharts of the operation of the video controller 14 and the engine controller 24, showing the procedure for resetting controllers 14 and 24 where the operation of video controller 14 or engine controller 24 stops. Referring to FIGS. 4A and 4B, video and engine controllers 14 and 24 set the timeout variable to a predetermined value at step 40. This is for repeatedly transmitting a command message to the other controller (14 or 24) over a predetermined period of time, where a general communication error has occurred while transmitting the command message. Video controller 14 transmits the $\overline{CMSG}$ signal at step 42 At step 48, video controller 14 examines the $\overline{EMSG}$ signal from the engine controller 24, to see if there is an engine error. At step 44, the engine controller 24 performs an examination to see whether the $\overline{CMSG}$ signal has been transmitted by the video controller 14, and, at step 46, transmits the $\overline{EMSG}$ signal, corresponding to the $\overline{CMSG}$ signal, back to the video controller 14. The engine controller 24 repeatedly performs steps 40, 44, and 46 when the $\overline{CMSG}$ signal is received from the video controller 14 in a normal operating state.

When the $\overline{CMSG}$ signal has not been sent from video controller 14, the engine controller 24 examines the timeout variable, at step 56. When the timeout variable is greater than zero, the engine controller 24 reduces it at step 58, and checks again whether the $\overline{CMSG}$ signal has been received, looping back to step 44. When the timeout variable is zero (step 56), the engine controller 24 outputs the $\overline{VRS}$ signal at step 60, to the video controller 14, the engine controller 24 having found that an error has occurred in the video controller 14. The video controller 14 performs its normal operation after being reset by the $\overline{VRS}$ signal transmitted from the engine controller 24.

The video controller 14 examines the $\overline{EMSG}$ signal transmitted from the engine controller 24 for engine errors at step 48. If the engine controller 24 is in a normal state, steps 40, 42, and 48 will be repeatedly performed to transmit the $\overline{CMSG}$ signal to the engine controller 24. Alternatively, when an engine controller error has occurred, the video controller 14 determines if the timeout variable's value is equal to zero signifying the timing loop is complete at step 50. If the timeout variable is greater than zero, the video controller 14 reduces the timeout variable at step 52, and then retransmits the $\overline{CMSG}$ signal to the engine controller 24 at step 42. When the timeout variable is zero at step 50, the video controller 14 sends a reset signal, $\overline{ERS}$ to the engine controller 24, since a completion of the timer timeout period signifies that a failure has occurred in the engine controller 24 (step 54). The engine controller 24 should the resume normal operation after receiving this reset signal.

In conclusion, the video and engine controllers 14 and 24 send messages to each other sending reset signals to each other where there is no response received after a predetermined period. In this way the malfunctioning unit is reset and normal operation can resume, while the timeout variable is reset to the timeout variable that is set when a normal $\overline{CMSG}$ or $\overline{EMSG}$ signal is received.

As described above, in an image forming device having video and engine controllers, the present invention allows the image forming device to resume normal operation by sensing and resetting a stopped controller, thereby ensuring the reliability of the image forming device, and preventing delay and inconvenience resulting from the necessity of manually interrupting the power to reset the device.

The laser printer is an example of the preferred embodiment of the present invention, but the present invention can be applied to any other image forming device having video and engine controllers without modification.

It should be understood that the present invention is not limited to the particular embodiment disclosed herein as the best mode contemplated for carrying out the present invention, but that the present invention is not limited to the specific embodiments described in this specification except as defined in the appended claims.

What is claimed is:

1. In an image forming device having video and engine control units, a video interfacing method comprising the steps of:

setting a timeout variable in order to repeatedly transmit a message over a predetermined time period when there has been a communications error, while the video and engine control units transmit and receive status messages to and from each other; and transmitting a reset signal from one control unit to the other control unit to reset the other control unit when a predetermined message had not been received during the set timeout variable, while the video and engine control units transmit and receive the message to and from each other, the video control unit transmitting a predetermined command message to the engine controller after setting the timeout variable, the video control unit checking for an engine message received from the engine control unit for a response to the command message, the video control unit transmitting a reset signal to the engine control unit when a normal engine response message is not received during the set timeout variable.

2. The method according to claim 1, the engine control unit transmitting the engine message, responding to the predetermined command message, when the command message has been received from the video control unit after setting the timeout variable, the engine control unit transmitting the reset signal to the video control unit when the command message has not been received during the set timeout variable.

3. The method according to claim 1, the set timeout variable being reset when the command message or normal engine response message has been received.

4. The method according to claim 2, the set timeout variable being reset when the command message or normal engine message has been received.

5. An image forming device comprising:

video and engine control units;

the video and engine control units each including means for setting a timeout variable in order to repeatedly transmit a message over a predetermined time period when there has been a communications error, while the video and engine control units transmit and receive status messages to and from each other; and the video and engine control units each including means for transmitting a reset signal from one control unit to the other control unit to reset the other control unit when a predetermined message had not been received during the set timeout variable, while the video and engine control units transmit and receive the message to and from each other, the video control unit including means for transmitting a predetermined command message to the engine controller after setting the timeout variable, the video control unit including means for checking for an engine message received from the engine control unit for a response to the command message, the video control unit including means for transmitting a reset signal to the engine control unit when a normal engine response message is not received during the set timeout variable.

6. The device according to claim 5, the engine control unit including means for transmitting the engine message, responding to the predetermined command message, when the command message has been received from the video control unit after setting the timeout variable, the engine control unit including means for transmitting the reset signal to the video control unit when the command message has not been received during the set timeout variable.

7. The device according to claim 5, the set timeout variable being reset when the command message or normal engine response message has been received.

8. The device according to claim 6, the set timeout variable being reset when the command message or normal engine message has been received.

* * * * *